US010637937B2

(12) United States Patent
Wang

(10) Patent No.: US 10,637,937 B2
(45) Date of Patent: Apr. 28, 2020

(54) METHOD FOR SERVICE CHAIN POLICY FORMULATION AND DEVICE

(71) Applicant: HUAWEI TECHNOLOGIES CO., LTD., Shenzhen (CN)

(72) Inventor: Shuo Wang, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 93 days.

(21) Appl. No.: 15/822,221

(22) Filed: Nov. 27, 2017

(65) Prior Publication Data

US 2018/0077247 A1 Mar. 15, 2018

Related U.S. Application Data

(63) Continuation of application No. PCT/CN2015/080986, filed on Jun. 8, 2015.

(51) Int. Cl.
G06F 15/173 (2006.01)
H04L 29/08 (2006.01)
(Continued)

(52) U.S. Cl.
CPC .......... H04L 67/16 (2013.01); H04L 12/1407 (2013.01); H04L 65/1063 (2013.01);
(Continued)

(58) Field of Classification Search
CPC . H04L 67/16; H04L 65/1063; H04L 12/1407; H04W 72/04; H04W 76/10;
(Continued)

(56) References Cited

U.S. PATENT DOCUMENTS

2009/0016344 A1 1/2009 Hu et al.
2010/0039936 A1* 2/2010 Jin .......................... H04L 47/10
370/230
(Continued)

FOREIGN PATENT DOCUMENTS

CN 101047949 A 10/2007
CN 101720113 A 6/2010
(Continued)

OTHER PUBLICATIONS

Huawei, Hisilicon, NTT DOCOMO. "Solution for 3GPP Resource Management for Background Data Transfer", 3GPF, SA WG2 Meeting #107, S2-150532, Jan. 30, 2015 (Jan. 30, 2015), p. 2.
(Continued)

Primary Examiner — Liang Che A Wang
Assistant Examiner — Johnny B Aguiar
(74) Attorney, Agent, or Firm — Kilpatrick Townsend & Stockton LLP

(57) ABSTRACT

Embodiments presented herein provide a method, including: receiving, by a policy and charging rules function unit (PCRF) by using a service capability exposure function unit (SCEF), a message sent by an application server (AS). The message is used to request to formulate a service chain policy for a service flow of user equipment (UE), and includes a service chain requirement of the service flow. The method further includes formulating, by the PCRF, the service chain policy for the service flow according to the service chain requirement included in the first message. The service chain policy includes a service chain function provided to the service flow. When a user needs to implement a service, the PCRF formulates, according to a message sent by the AS that includes a requirement of a service flow corresponding to the service, a service chain policy that is suitable for the service flow.

16 Claims, 9 Drawing Sheets

(51) Int. Cl.
*H04W 72/04* (2009.01)
*H04L 29/06* (2006.01)
*H04L 12/14* (2006.01)
*H04M 15/00* (2006.01)
*H04W 76/10* (2018.01)
*H04W 28/02* (2009.01)

(52) U.S. Cl.
CPC ........... *H04M 15/61* (2013.01); *H04M 15/66* (2013.01); *H04W 28/0268* (2013.01); *H04W 72/04* (2013.01); *H04W 76/10* (2018.02)

(58) Field of Classification Search
CPC .. H04W 28/0268; H04M 15/61; H04M 15/66
USPC .................................................. 709/220, 223
See application file for complete search history.

(56) References Cited

U.S. PATENT DOCUMENTS

| | | | | |
|---|---|---|---|---|
| 2016/0330647 | A1* | 11/2016 | Iwai | H04W 28/0268 |
| 2016/0344803 | A1* | 11/2016 | Batz | H04L 12/1407 |
| 2017/0019750 | A1* | 1/2017 | Palanisamy | H04W 28/0289 |
| 2017/0201629 | A1* | 7/2017 | Li | H04L 12/1407 |
| 2018/0070268 | A1* | 3/2018 | Iwai | H04W 8/00 |

FOREIGN PATENT DOCUMENTS

| | | |
|---|---|---|
| CN | 102131296 A | 7/2011 |
| CN | 102136983 A | 7/2011 |

OTHER PUBLICATIONS

Ericsson. "Set up and Change of the Chargeable Party-AS Authorization and Reporting", 3GPP, SA WG2 Meeting #107, S2-150090, Jan. 30, 2015 (Jan. 30, 2015), p. 2.

SA WG2 Meeting #107 S2-150532 (revision of S2-150104),"Solution for 3GPP resource management for background data transfer",Huawei, HiSilicon, NTT DOCOMO,Jan. 26-30, 2015,total 3 pages.

SA WG2 Meeting #107 S2-150090,"Set up and change of the chargeable party—AS authorization and reporting", Ericsson,Jan. 26-30, 2015,total 5 pages.

Wu D Wang Huawei M Boucadair C Jacquenet France Telecom X Zhang Y Shi Huawei Q:"Service Function Chain Control Plane Overview;draft-ww-sfc-controlplane-00.txt",IETF;Feb. 14, 2014,total 16 pages.

3GPP TR 23.708 V1.3.0 (Jun. 2015),3rd Generation Partnership Project;Technical Specification Group Services and System Aspects;Architecture Enhancements for Service Capability Exposure(Release 13),total 32 pages.

3GPP TS 23.203: "Policy and charging control architecture (Release 9)".

* cited by examiner

METHOD FOR SERVICE CHAIN POLICY FORMULATION AND DEVICE

CROSS-REFERENCE TO RELATED APPLICATIONS

This application is a continuation of International Application PCT/CN2015/080986, filed on Jun. 8, 2015, the disclosure of which is hereby incorporated by reference in its entirety.

TECHNICAL FIELD

The present invention relates to the field of communications technologies, and specifically, to a method for service chain policy formulation and a device.

BACKGROUND

An SAE system architecture is constructed in a System Architecture Evolution (SAE) project in the 3rd Generation Partnership Project (3GPP). At least one service function enabling unit (service function enabler) can be deployed between an operator gateway and an external network to form a service chain.

In a field such as mobile broadband, fixed broadband, or a data center application, a specific service flow of a specific user has at least one value-added service requirement. Each value-added service requirement is corresponding to at least one service function enabling unit. For example, a video service flow needs to pass through a service chain formed by service function enabling units corresponding to two value-added services of a caching service and a firewall, and completes a value-added service of the video service flow by using the caching service and the firewall.

In the prior art, a service chain that a specific service flow needs to pass through is determined by a service chain policy generated by a policy and charging rules function (PCRF) unit. Formulation of the policy depends on related information of a user, and the policy is determined when the user attaches to a network and a default bearer is established. However, when the user uses a specific service, a service enabling unit that a service flow of the specific service needs to pass through may not actually be in the service chain policy determined when the user attaches to the network, or the service chain policy includes a service enabling unit that the specific service flow does not need. Obviously, such a service chain policy formulation manner is not accurate and flexible enough.

Therefore, how to flexibly formulate a more accurate service chain policy is an urgent problem to be resolved.

SUMMARY

To resolve the foregoing problem in the prior art, embodiments of the present invention provide a method for service chain policy formulation, a related device, and a system, so that a service chain policy can be flexibly and accurately formulated.

According to a first aspect, an embodiment of the present invention provides a service chain policy formulation method, where the method includes: receiving, by a policy and charging rules function unit PCRF by using a service capability exposure function unit SCEF, a first message sent by an application server AS, where the first message is used to request to formulate a service chain policy for a service flow of user equipment UE, and the first message includes a service chain requirement of the service flow; and formulating, by the PCRF, the service chain policy for the service flow according to the service chain requirement that is of the service flow and that is included in the first message, where the service chain policy includes a service chain function provided to the service flow.

With reference to the first aspect, in a first implementation of the first aspect, before the receiving, by a PCRF by using an SCEF, a first message sent by an AS, the method further includes: receiving, by the PCRF by using the SCEF, a second message sent by the AS, where the second message is used to request to query a service chain function in a network for the service flow; determining, by the PCRF according to the second message, a first service chain function list that can be provided by the PCRF to the AS; and sending, by the PCRF, a third message to the AS by using the SCEF, where the third message includes the first service chain function list, and the service chain requirement is determined according to the first service chain function list.

With reference to the first aspect and the foregoing implementation, in a second implementation of the first aspect, the first message includes at least one of a user identity of the UE, an application identifier of the service flow, an access point name, or a media type of the service flow; when the first message includes the user identity of the UE, the method further includes: determining, by the PCRF, a service chain function that can be provided by the network to the UE; the formulating, by the PCRF, the service chain policy for the service flow includes: formulating the service chain policy according to the service chain requirement and the service chain function that can be provided by the network to the UE; and the service chain policy includes a service chain function corresponding to an intersection set of a service chain function in the service chain requirement and the service chain function that can be provided to the UE; or when the first message includes the application identifier of the service flow, the method further includes: determining, by the PCRF, a service chain function that can be provided by the network to the service flow; the formulating, by the PCRF, the service chain policy for the service flow includes: formulating the service chain policy according to the service chain requirement and the service chain function that can be provided by the network to the service flow; and the service chain policy includes a service chain function corresponding to an intersection set of a service chain function in the service chain requirement and the service chain function that can be provided to the service flow; or when the first message includes the access point name, the method further includes: determining, by the PCRF, a service chain function that can be provided by the network to the service flow that flows through the access point; the formulating, by the PCRF, the service chain policy for the service flow includes: formulating the service chain policy according to the service chain requirement and the service chain function that can be provided by the network to the service flow that flows through the access point; and the service chain policy includes a service chain function corresponding to an intersection set of a service chain function in the service chain requirement and the service chain function that can be provided to the service flow that flows through the access point; or when the first message includes the media type of the service flow, the method further includes: determining, by the PCRF according to the media type, a service chain function that can be provided by the network to the service flow; the formulating, by the PCRF, the service chain policy for the service flow includes: formulating the service chain policy according to the service chain requirement and the service chain function that can be provided by the network to the service flow; and the service chain policy includes a service chain function corresponding to an intersection set of a service chain function in the service chain requirement and the service chain function that can be provided to the service flow.

With reference to the first aspect and the foregoing implementations, in a third implementation of the first aspect, the second message includes at least one of the user identity of the UE, the application identifier of the service flow, the access point name, or the media type of the service flow; when the second message includes the user identity of the UE, the first service chain function list includes the service chain function that can be provided by the network to the UE; or when the second message includes the application identifier of the service flow, the first service chain function list includes the service chain function that can be provided by the network to the service flow; or when the second message includes the access point name, the first service chain function list includes the service chain function that can be provided by the network to the service flow that flows through the access point; or when the second message includes the media type of the service flow, the first service chain function list includes the service chain function that can be provided by the network to the service flow corresponding to the media type.

With reference to the first aspect and the foregoing implementations, in a fourth implementation of the first aspect, the service chain policy is corresponding to a second service chain function list, and the second service chain function list includes a service chain function used by the service chain policy; and after the formulating, by the PCRF, the service chain policy for the service flow, the method further includes: sending, by the PCRF, a fourth message to the AS by using the SCEF, where the fourth message includes the second service chain function list.

With reference to the first aspect and the foregoing implementations, in a fifth implementation of the first aspect, when a service provider deploys a service function enabling unit in a service chain of the network, and the service chain requirement includes a service chain function corresponding to the service function enabling unit deployed by the service provider, the service chain policy includes the service chain function corresponding to the service function enabling unit deployed by the service provider.

With reference to the first aspect and the foregoing implementations, in a sixth implementation of the first aspect, when the service provider deploys the service function enabling unit in the service chain of the network, and the second message includes information that indicates the service function enabling unit deployed by the service provider, the first service chain function list includes the service chain function corresponding to the service function enabling unit deployed by the service provider.

According to a second aspect, an embodiment of the present invention provides another service chain policy formulation method, where the method includes: determining, by an application server AS, that a service chain policy needs to be formulated for a service flow of user equipment UE; and sending, by the AS, a first message to a charging rules function unit PCRF by using a service capability exposure function unit SCEF, where the first message is used to request to formulate the service chain policy for the service flow, and the first message includes a service chain requirement of the service flow, so as to instruct the PCRF to formulate the service chain policy for the service flow according to the first message.

With reference to the second aspect, in a first implementation of the second aspect, the determining, by an AS, that a service chain policy needs to be formulated for a service flow includes: determining, according to a fifth message received from the UE, that the service chain policy needs to be formulated for the service flow, where the fifth message is used to trigger the AS to request the PCRF to formulate the service chain policy for the service flow; or the determining, by an AS, that a service chain policy needs to be formulated for a service flow includes: determining that the service chain policy needs to be formulated for the service flow, by learning by means of analysis that the UE has a service flow that needs to be executed.

With reference to the second aspect and the foregoing implementation, in a second implementation of the second aspect, before the sending, by the AS, a first message to the PCRF by using the SCEF, the method further includes: sending, by the AS, a second message to the PCRF by using the SCEF, where the second message is used to request to query a service chain function in a network for the service flow; receiving, by the AS by using the SCEF, a third message sent by the PCRF according to the second message, where the third message includes a first service chain function list that can be provided by the PCRF to the AS; and determining, by the AS, the service chain requirement of the service flow according to the first service chain function list included in the third message.

With reference to the second aspect and the foregoing implementations, in a third implementation of the second aspect, the first message or the second message includes at least one of a user identity, an application identifier, an access point name, or a media type.

With reference to the second aspect and the foregoing implementations, in a fourth implementation of the second aspect, the method further includes: receiving, by the AS by using the SCEF, a fourth message sent by the PCRF, where the fourth message includes a second service chain function list, and the second service chain function list includes a service chain function used by the service chain policy.

With reference to the second aspect and the foregoing implementations, in a fifth implementation of the second aspect, when a service provider deploys a service function enabling unit in a service chain of the network, and the service chain requirement includes a service chain function corresponding to the service function enabling unit deployed by the service provider, the service chain policy includes the service chain function corresponding to the service function enabling unit deployed by the service provider.

With reference to the second aspect and the foregoing implementations, in a sixth implementation of the second aspect, when the service provider deploys the service function enabling unit in the service chain of the network, and the second message includes information that indicates the service function enabling unit deployed by the service provider, the first service chain function list includes the service chain function corresponding to the service function enabling unit deployed by the service provider.

According to a third aspect, an embodiment of the present invention provides a PCRF, configured to formulate a service chain policy, where the PCRF includes: a receiving unit, configured to receive, by using a service capability exposure function unit SCEF, a first message sent by an application server AS, where the first message is used to request to formulate a service chain policy for a service flow of user equipment UE, and the first message includes a service chain requirement of the service flow; and a processing unit, configured to formulate the service chain policy for the service flow according to the service chain requirement that is of the service flow and that is included in the first message, where the service chain policy includes a service chain function provided to the service flow.

With reference to the third aspect, in a first implementation of the third aspect, the receiving unit is further configured to: before receiving, by using the SCEF, the first message sent by the AS, receive, by using the SCEF, a second message sent by the AS, where the second message is used to request to query a service chain function in a network for the service flow; the processing unit is further configured to determine, according to the second message, a first service chain function list that can be provided by the PCRF to the AS; and the PCRF further includes: a sending unit, configured to send a third message to the AS by using the SCEF, where the third message includes the first service chain function list, and the service chain requirement is determined according to the first service chain function list.

With reference to the third aspect and the foregoing implementation, in a second implementation of the third aspect, the first message includes at least one of a user identity of the UE, an application identifier of the service flow, an access point name, or a media type of the service flow; when the first message includes the user identity of the UE, the processing unit is further configured to determine a service chain function that can be provided by the network to the UE; that the processing unit formulates the service chain policy for the service flow includes: formulating the service chain policy according to the service chain requirement and the service chain function that can be provided by the network to the UE; and the service chain policy includes an intersection set function of a service chain function in the service chain requirement and the service chain function that can be provided to the UE; or when the first message includes the application identifier of the service flow, the processing unit is further configured to determine a service chain function that can be provided by the network to the service flow; that the processing unit formulates the service chain policy for the service flow includes: formulating the service chain policy according to the service chain requirement and the service chain function that can be provided by the network to the service flow; and the service chain policy includes an intersection set function of a service chain function in the service chain requirement and the service chain function that can be provided to the service flow; or when the first message includes the access point name, the processing unit is further configured to determine a service chain function that can be provided by the network to the service flow that flows through the access point; that the processing unit formulates the service chain policy for the service flow includes: formulating the service chain policy according to the service chain requirement and the service chain function that can be provided by the network to the service flow that flows through the access point; and the service chain policy includes an intersection set function of a service chain function in the service chain requirement and the service chain function that can be provided to the service flow that flows through the access point; or when the first message includes the media type of the service flow, the processing unit is further configured to determine, according to the media type, a service chain function that can be provided by the network to the service flow; that the processing unit formulates the service chain policy for the service flow includes: formulating the service chain policy according to the service chain requirement and the service chain function that can be provided by the network to the service flow; and the service chain policy includes an intersection set function of a service chain function in the service chain requirement and the service chain function that can be provided to the service flow.

With reference to the third aspect and the foregoing implementations, in a third implementation of the third aspect, the second message includes at least one of the user identity of the UE, the application identifier of the service flow, the access point name, or the media type of the service flow; when the second message includes the user identity of the UE, the first service chain function list includes the service chain function that can be provided by the network to the UE; or when the second message includes the application identifier of the service flow, the first service chain function list includes the service chain function that can be provided by the network to the service flow; or when the second message includes the access point name, the first service chain function list includes the service chain function that can be provided by the network to the service flow that flows through the access point; or when the second message includes the media type of the service flow, the first service chain function list includes the service chain function that can be provided by the network to the service flow corresponding to the media type.

With reference to the third aspect and the foregoing implementations, in a fourth implementation of the third aspect, the service chain policy is corresponding to a second service chain function list, and the second service chain function list includes a service chain function used by the service chain policy; and the sending unit is further configured to: after the processing unit formulates the service chain policy for the service flow, send a fourth message to the AS by using the SCEF, where the fourth message includes the second service chain function list.

With reference to the third aspect and the foregoing implementations, in a fifth implementation of the third aspect, when a service provider deploys a service function enabling unit in a service chain of the network, and the service chain requirement includes a service chain function corresponding to the service function enabling unit deployed by the service provider, the service chain policy includes the service chain function corresponding to the service function enabling unit deployed by the service provider.

With reference to the third aspect and the foregoing implementations, in a sixth implementation of the third aspect, when the service provider deploys the service function enabling unit in the service chain of the network, and the second message includes information that indicates the service function enabling unit deployed by the service provider, the first service chain function list includes the service chain function corresponding to the service function enabling unit deployed by the service provider.

According to a fourth aspect, an embodiment of the present invention provides an AS, configured to formulate a service chain policy, where the AS includes: a processing unit, configured to determine that a service chain policy needs to be formulated for a service flow of user equipment UE; and a sending unit, configured to send a first message to a charging rules function unit PCRF by using a service capability exposure function unit SCEF, where the first message is used to request to formulate the service chain policy for the service flow, and the first message includes a service chain requirement of the service flow, so as to instruct the PCRF to formulate the service chain policy for the service flow according to the first message.

With reference to the fourth aspect, in a first implementation of the fourth aspect, that the processing unit determines that a service chain policy needs to be formulated for a service flow includes: determining that the service chain policy needs to be formulated for the service flow, by learning by means of analysis that the UE has a service flow that needs to be executed; or the AS further includes: a receiving unit, configured to receive a fifth message sent by the UE; and correspondingly, that the processing unit determines that a service chain policy needs to be formulated for a service flow includes: determining, according to the fifth message received by the receiving unit, that the service chain policy needs to be formulated for the service flow, where the fifth message is used to trigger the AS to request the PCRF to formulate the service chain policy for the service flow.

With reference to the fourth aspect and the foregoing implementation, in a second implementation of the fourth aspect, the sending unit is further configured to: before sending the first message to the PCRF by using the SCEF, send a second message to the PCRF by using the SCEF, where the second message is used to request to query a service chain function in a network for the service flow; the receiving unit is configured to receive, by using the SCEF, a third message sent by the PCRF according to the second message, where the third message includes a first service chain function list that can be provided by the PCRF to the AS; and the processing unit is further configured to determine the service chain requirement of the service flow according to the first service chain function list included in the third message.

With reference to the fourth aspect and the foregoing implementations, in a third implementation of the fourth aspect, the first message or the second message includes at least one of a user identity, an application identifier, an access point name, or a media type.

With reference to the fourth aspect and the foregoing implementations, in a fourth implementation of the fourth aspect, the receiving unit is further configured to receive, by using the SCEF, a fourth message sent by the PCRF, where the fourth message includes a second service chain function list, and the second service chain function list includes a service chain function used by the service chain policy.

With reference to the fourth aspect and the foregoing implementations, in a fifth implementation of the fourth aspect, when a service provider deploys a service function enabling unit in a service chain of the network, and the service chain requirement includes a service chain function corresponding to the service function enabling unit deployed by the service provider, the service chain policy includes the service chain function corresponding to the service function enabling unit deployed by the service provider.

With reference to the fourth aspect and the foregoing implementations, in a sixth implementation of the fourth aspect, when the service provider deploys the service function enabling unit in the service chain of the network, and the second message includes information that indicates the service function enabling unit deployed by the service provider, the first service chain function list includes the service chain function corresponding to the service function enabling unit deployed by the service provider.

According to a fifth aspect, an embodiment of the present invention provides a communications system. The communications system includes at least a PCRF and an AS, where the PCRF is the PCRF according to any one of the third aspect, and the AS is the AS according to any one of the fourth aspect.

According to the technical solutions provided in the embodiments of the present invention, when a user needs to implement a service, the PCRF formulates, according to a message that is sent by the AS and that includes a requirement of a service flow corresponding to the service, a service chain policy that is suitable for the service flow. Compared with the prior art in which a service chain policy is formulated when a user attaches to a network and before a specific to-be-implemented service is determined, the service chain policy formulation manner is more flexible, so that a more accurate and efficient service chain rule can be formulated.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, and an LTE system.

Figure 1:
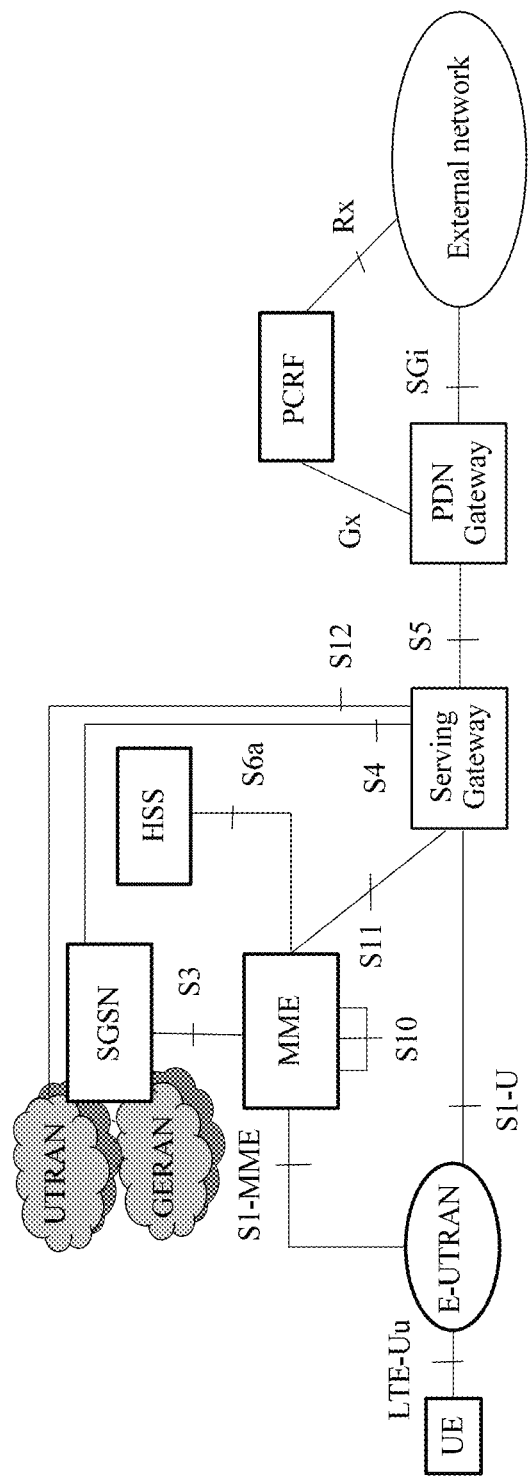
FIG. 1 is an architecture diagram of a 3GPP system according to an embodiment of the present invention.

Currently, a 3GPP system architecture may be shown in FIG. 1, and mainly includes the following network elements: an evolved UMTS terrestrial radio access network (E-UTRAN) that is used to implement a function related to a radio evolution network; a mobility management entity (MME) that takes charge of mobility management of a control plane, such as management of a user context and a mobility status and allocation of a user temporary identity; a serving gateway (S-GW) that is a user plane anchor point between 3GPP access networks; a packet data network gateway (PDN GW) that is a user plane anchor point between a 3GPP access network and a non-3GPP access network and an interface with an external packet data network (PDN); a PCRF unit that is configured to implement policy control rule formulation and flow-based charging; a home network server (HSS) that is configured to store subscriber subscription information; and user equipment (UE) that performs control plane and user plane interaction with an SAE by using the E-UTRAN. A UMTS terrestrial radio access network (UTRAN) and a GSM/EDGE radio access network (GERAN) are used to implement all radio-related functions in an existing GPRS/UMTS network. A serving general packet radio service support node (SGSN) is configured to implement routing and forwarding, mobility management, session management, user information storage, and other functions in the GPRS/UMTS network. By using the foregoing network elements, the UE may communicate with an external network.

Figure 2:
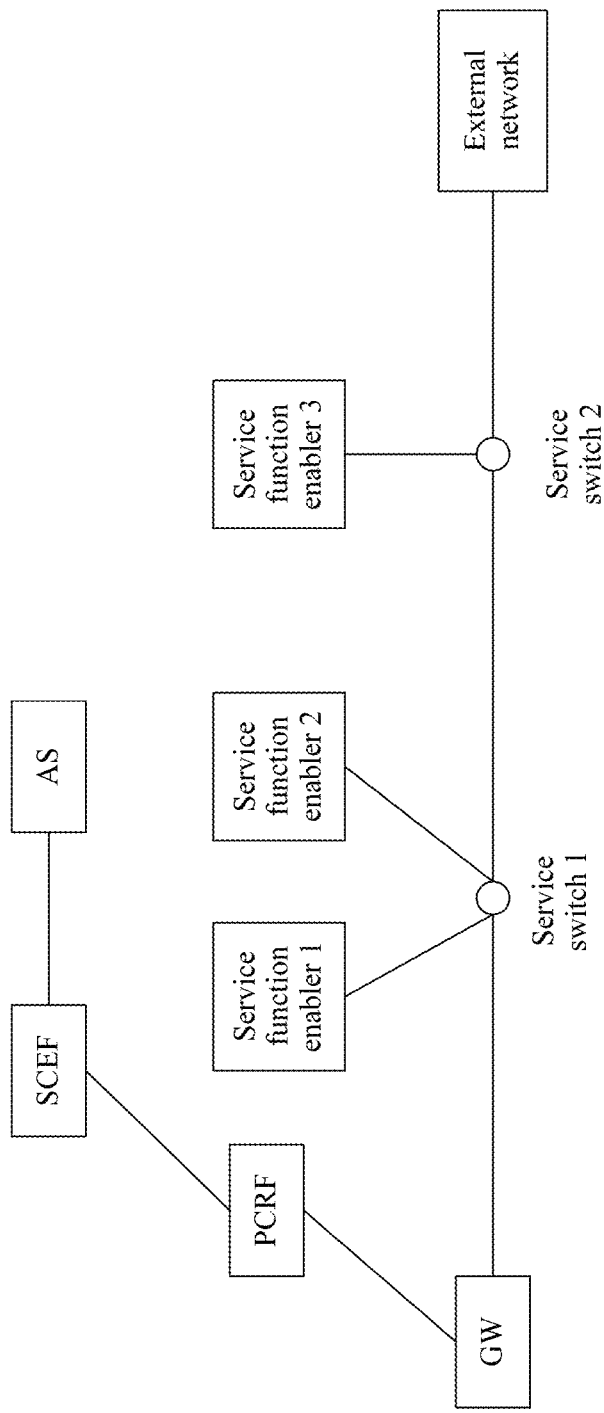
FIG. 2 is a diagram of an application scenario according to an embodiment of the present invention.

An application scenario of the embodiments of the present invention may be shown in FIG. 2. There is at least one service switch node between an operator gateway and an external network. Each service switch node supports at least one service function enabling unit, and the service switch node may send a data packet in a service flow to the service function enabling unit supported by the service switch node. The service function enabling unit may be corresponding to at least one value-added service, such as a firewall, video compression, or acceleration. The service function enabling unit may be deployed by an operator. According to the technical solutions provided in the embodiments of the present invention, the service function enabling unit may alternatively be deployed by a third-party service provider, to implement efficient integration with the service function enabling unit deployed by the operator, and provide richer value-added service options to the service flow. To implement the technical solutions provided in the embodiments of the present invention, a PCRF unit, a service capability exposure function (SCEF) unit, and an application server (AS) are further needed in the application scenario. The SCEF is configured to implement a function of discovering a network capability provided by the third-party service provider, a function of invoking the network capability, a function of authenticating a request of the third-party service provider, a charging function, and the like. The AS is configured to provide a service to a service flow of UE.

Figure 3:
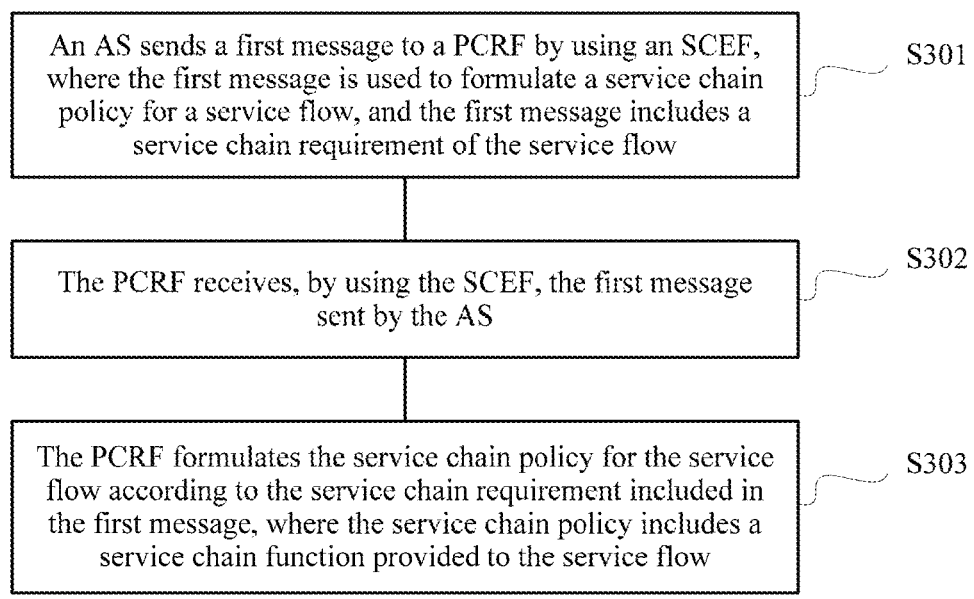
FIG. 3 is a flowchart of a service chain policy formulation method according to an embodiment of the present invention.

FIG. 3 is a flowchart of a method for service chain policy formulation according to an embodiment of the present invention. As shown in FIG. 3, the method includes the following steps:

S301. An AS sends a first message to a PCRF by using an SCEF, where the first message is used to request to formulate a service chain policy for a service flow, and the first message includes a service chain requirement of the service flow.

S302. The PCRF receives, by using the SCEF, the first message sent by the AS.

S303. The PCRF formulates the service chain policy for the service flow according to the service chain requirement included in the first message, where the service chain policy includes a service chain function provided to the service flow.

In this method, when UE that successfully attaches to a network has a service that needs to be implemented, the UE may trigger, by sending an instruction, the AS to send the first message, to request to formulate the service chain policy for the service flow. The service flow is corresponding to the service of the UE, and the service flow is a packet flow that needs to be transmitted from a source to a destination when the service is implemented. Certainly, the AS can learn, by means of analysis, that the UE has a service flow that needs to be executed, and actively send a first message.

In S301, optionally, the first message sent by the AS may be carried in an application programming interface (API) request, and the service chain requirement that is of the service flow and that is included in the first message may be at least one of value-added services such as a firewall, video compression, or acceleration. Correspondingly, in S303, the PCRF formulates the service chain policy for the service flow according to the service chain requirement. The service chain function provided to the service flow is a value-added service provided to the service flow, that is, a service function enabling unit through which the service flow flows.

Further, in addition to the service chain requirement of the service flow, according to a specific scenario requirement, the first message may further include at least one of a user identity (UE ID), an application identifier (application ID) of the service flow, an access point name (APN), or a media type. For example, if the first message includes the UE ID, the PCRF can associate a context of the UE according to the UE ID, and query subscription data of the UE from a subscription profile repository (SPR). The PCRF learns, according to the subscription data, a service chain function that can be provided to the UE. With reference to the service chain requirement that is in the first message and that is imposed by the UE, in S303, the PCRF formulates the service chain policy for the service flow. The service chain policy may include a service chain function corresponding to an intersection set of a service chain function in the service chain requirement and the service chain function that can be provided to the UE. For another example, if the first message includes the application ID, and the application ID is corresponding to an attribute of the current service flow, the PCRF can actively select, for the service flow by means of screening, a service chain function that is suitable for the service flow. Based on this and with reference to the service chain requirement that is in the first message and that is imposed by the UE, the PCRF formulates the service chain policy for the service flow. The service chain policy may include a service chain function corresponding to an intersection set of a service chain function in the service chain requirement and the service chain function that can be provided to the service flow. If the first message includes the APN or the media type, a function and a purpose of the APN or the media type are similar to those of the UE ID or the application ID. A more accurate service chain policy is formulated for the service flow by narrowing a service chain function selection range.

When the first message includes at least two of the UE ID, the application identifier of the service flow, the APN, or the media type, it may be understood that in S303, when the PCRF formulates the service chain policy for the service flow, the PCRF may formulate the service chain policy with reference to the service chain requirement and based on at least two service chain functions that can be provided to the UE or the service flow of the UE and that are learned according to information included in the first message. The service chain policy may include a service chain function corresponding to an intersection set of at least three parts of the foregoing corresponding service chain functions.

Optionally, if a service provider deploys, in the network, a service function enabling unit of the service provider, the service chain requirement may include a service chain function corresponding to the service function enabling unit of the service provider. In this way, when formulating the service chain policy, the PCRF can consider including the service chain function corresponding to the service function enabling unit of the service provider.

For example, such a scenario is considered. A value-added service that can be supported by a service function enabling unit deployed by an operator includes content filtering, a caching service, video compression, and a firewall. A third-party service provider also deploys a service function enabling unit in a service chain, and the service function enabling unit deployed by the service provider supports an acceleration function. If the service chain requirement that is of the service flow of the UE and that is indicated in the first message includes content filtering, a caching service, video compression, and acceleration, the PCRF formulates the service chain policy that belongs to the service flow of the UE, and the service chain policy includes content filtering, a caching service, video compression, and an acceleration function.

Further, if the first message further includes the UE ID, the PCRF associates the context of the UE according to the UE ID, queries the subscription data of the UE from the SPR, and discovers that the UE has no permission to use the value-added service of content filtering. In this case, when formulating the service chain policy, the PCRF considers this permission and excludes content filtering from the service chain policy.

Optionally, after S303, the method may further include the following steps:

S304. The PCRF sends a fourth message to the AS by using the SCEF, where the fourth message includes a service chain function list provided in the service chain policy that is formulated by the PCRF for the service flow.

S305. The AS receives, by using the SCEF, the fourth message sent by the PCRF.

S304 is a supplement to the foregoing method steps, and aims to notify the AS of a formulation result of the service chain policy. Particularly, a beneficial effect is obvious when a service chain policy actually formulated by the PCRF is not completely consistent with the service chain requirement, because the AS can learn that a requirement of the AS is not completely met. In this case, the AS may determine, according to the fourth message, to agree with the service chain policy, or may take a measure to coordinate to attempt to modify the service chain policy.

In S303, the service chain policy formulated by the PCRF may be corresponding to a service chain function list. The service chain function list includes a service chain function used by the service chain policy, that is, the service chain function list that is indicated in the fourth message in S304 and that is provided in the service chain policy formulated by the PCRF for the service flow.

Optionally, the fourth message further includes charging information related to a service function enabling unit corresponding to the service chain function list in step S304.

Optionally, the fourth message includes a service chain policy identifier, so as to authenticate the service chain policy subsequently in a service establishment process.

A complete process of establishing a service for the UE is briefly described herein. After the PCRF formulates the service chain policy, the PCRF may deliver the service chain policy to a policy and charging enforcement function (PCEF) unit by using a flow classifier, so that the PCEF executes the service chain policy.

The PCEF feeds back a policy receiving response to the PCRF by using the flow classifier.

The PCRF sends a service establishment success message to the AS by using the SCEF.

In this case, a service corresponding to the service flow is successfully established, and corresponding service flow transmission can be started.

In S301, S302, or between S301 and S302, during specific implementation of the method in this embodiment of the present invention, the following specific step may be included. After receiving the first message sent by the AS, the SCEF authenticates the first message of the AS to determine authorization for the AS to perform this operation. When the SCEF determines that the operation performed by the AS is authorized, the SCEF sends information included in the first message to the PCRF. Optionally, when the first message includes the APN, the SCEF may select, according to the APN in the first message, the PCRF to which the information included in the first message is forwarded. Specifically, when the first message is carried in the API request, the SCEF may convert the API request into a Diameter message by using the Diameter protocol and sends the Diameter message to the PCRF, and the Diameter message includes the information included in the first message.

According to the technical solution provided in this embodiment of the present invention, when a user needs to implement a service, the PCRF formulates, according to a message that is sent by the AS and that includes a requirement of a service flow corresponding to the service, a service chain policy that is suitable for the service flow. Compared with the prior art in which a service chain policy is formulated when a user attaches to a network and before a specific to-be-implemented service is determined, the service chain policy formulation manner is more flexible, so that a more accurate and efficient service chain rule can be formulated. In addition, in the prior art, because the operator subscribes to a large quantity of third-party service providers, costs for obtaining subscription data updated in real time are high. Consequently, although a third party can deploy a service function enabling unit of the third party between an operator gateway and an external network, the PCRF cannot learn specific function information of the service function enabling unit deployed by the third-party service provider, and cannot add the specific function information to the service chain policy and provide the specific function information to the AS. By means of the technical solution of the present invention, the AS only needs to specify, in the service chain requirement, an expected service chain function that is provided by a specific third-party service provider, and even though the PCRF does not know what the service chain function is, the PCRF can add the service chain function to the service chain policy and provide the service chain function to the AS. Therefore, the technical solution of the present invention provides a low cost implementation for a service flow of a UE service to use a service chain function provided by a third-party service provider.

Figure 4:
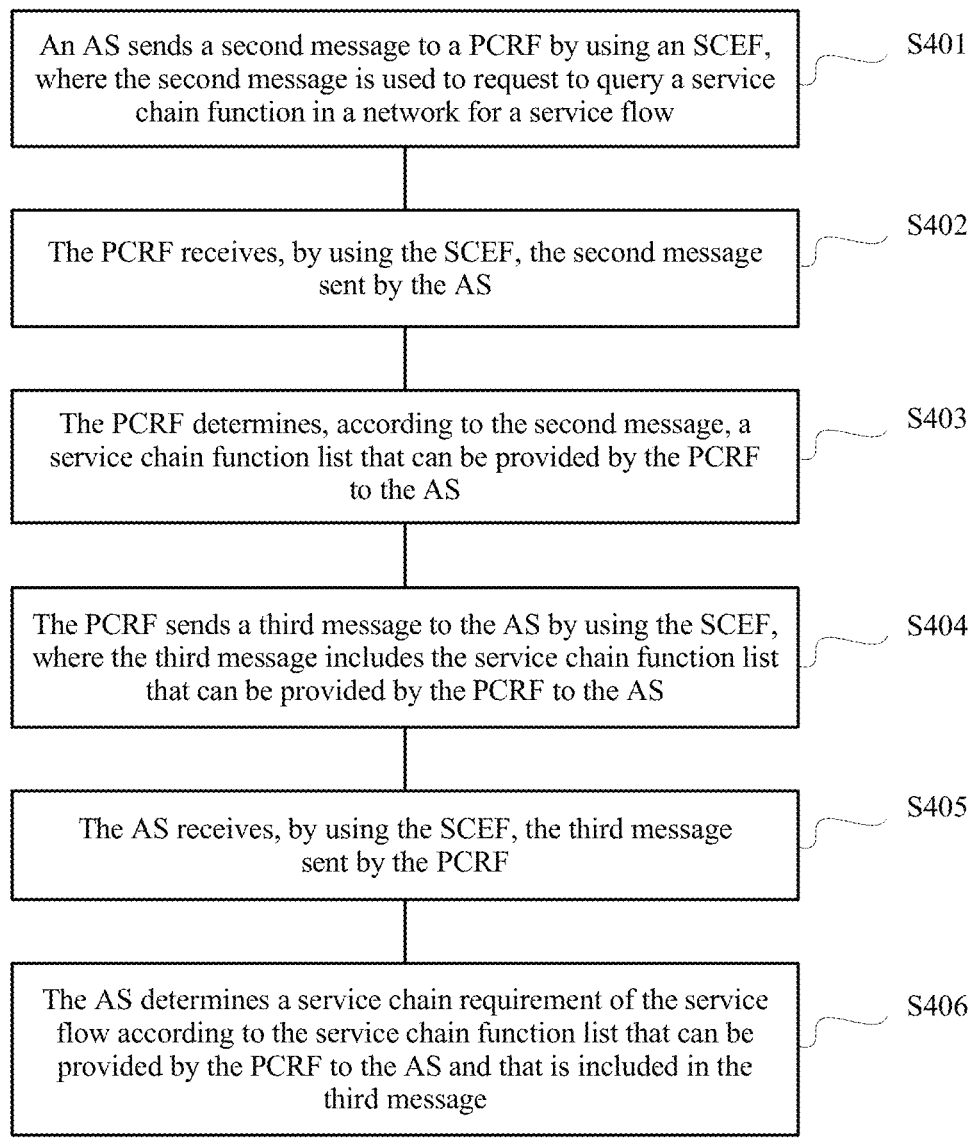
FIG. 4 is a flowchart of another service chain policy formulation method according to an embodiment of the present invention.

FIG. 4 is a flowchart of another method for service chain policy formulation according to an embodiment of the present invention. The method is performed based on the method shown in FIG. 3. Before S301, the method includes the following steps:

S401. The AS sends a second message to the PCRF by using the SCEF, where the second message is used to request to query a service chain function in a network for the service flow.

S402. The PCRF receives, by using the SCEF, the second message sent by the AS.

S403. The PCRF determines, according to the second message, a service chain function list that can be provided by the PCRF to the AS.

S404. The PCRF sends a third message to the AS by using the SCEF, where the third message includes the service chain function list that can be provided by the PCRF to the AS.

S405. The AS receives, by using the SCEF, the third message sent by the PCRF.

S406. The AS determines the service chain requirement of the service flow according to the service chain function list that can be provided by the PCRF to the AS and that is included in the third message.

In addition to obtaining, from the UE, an attribute of the service flow corresponding to the service that needs to be implemented, if the AS can learn in advance the service chain function list that can be provided by the PCRF to the AS, obviously, the AS can accordingly impose a more proper service chain requirement, to prevent a service chain function that cannot be provided by the PCRF from being included in the service chain requirement. Therefore, before S301 is performed, the steps provided in this embodiment of the present invention may be performed.

The AS sends the second message to the PCRF by using the SCEF. The second message is used to request to query, for the service flow, the service function enabling unit deployed in the network between the operator gateway and the external network.

Similar to the first message in S301, the second message sent by the AS may be carried in the API request. In S403, the PCRF forms, according to the second message, all service chain functions deployed in the network into the service chain function list, and returns the service chain function list to the AS by using the third message in S404.

Optionally, the second message may include at least one of the UE ID, the application ID of the service flow, the APN, or the media type. For example, if the second message includes the UE ID, the PCRF can associate the context of the UE according to the UE ID, and query the subscription data of the UE from the subscription profile repository (SPR). The PCRF learns, according to the subscription data, the service chain function that can be provided to the UE, and therefore forms the service chain function that can be provided to the UE into a service chain function list, and provides the service chain function list to the AS. For another example, if the first message includes the application ID, the application ID is corresponding to the attribute of the current service flow, and the PCRF can actively select, for the service flow by means of screening, the service chain function that is suitable for the service flow, form the service chain function that is suitable for the service flow into a service chain function list, and provide the service chain function list to the AS. If the first message includes the APN or the media type, the function and the purpose of the APN or the media type are similar to those of the UE ID or the application ID. Based on all service chain functions that can be provided by the network to the AS, and with reference to a specific status of the UE or the service flow, the service chain function that can be provided to the AS is narrowed, and a function list having more reference value is provided to the AS, so that the AS imposes a more proper service chain requirement.

When the second message includes at least two of the UE ID, the application identifier of the service flow, the APN, or the media type, the PCRF may obtain service chain functions that are respectively corresponding to the at least two types of information and that can be provided to the UE or the service flow of the UE, form a service chain function list based on an intersection set of the service chain functions, and provide the service chain function list to the AS.

Optionally, if a service provider deploys, in the network, a service function enabling unit of the service provider, the second message may include information that indicates a service chain function corresponding to the service function enabling unit of the service provider. In this way, in S403, when determining the service chain function list that can be provided to the AS, the PCRF may include the service chain function corresponding to the service function enabling unit of the service provider.

For example, such a scenario is considered. A value-added service that can be supported by a service function enabling unit deployed by the operator includes content filtering, a caching service, and a firewall. A service provider also deploys a service function enabling unit in a service chain, and the service function enabling unit deployed by the service provider supports an acceleration function. Therefore, the service chain function list provided by the PCRF to the AS may include content filtering, a caching service, a firewall, and an acceleration function, so that the AS performs selection according to a characteristic of the service flow and determines the service chain requirement. Certainly, if the subscription data of the UE does not provide a content filtering service, the service chain function list provided by the PCRF to the AS may have only a caching service, a firewall, and an acceleration function.

In S406, when the AS obtains, by using the third message, the service chain function that can be provided by the network to the AS, the AS selects, according to the attribute of the service flow of the UE and from the service chain function that can be provided by the network to the AS, a service chain function that actually needs to be provided to the service flow, and uses the service chain function as the service chain requirement.

According to the technical solution provided in this embodiment of the present invention, the AS selects a required service chain function on demand according to the obtained service chain function list that can be provided by the PCRF, so that the service chain requirement can be more proper, and a network side can better provide an optimized service to the service.

Optionally, S401 to S405 of the method shown in FIG. 4 may be independent of the method embodiment shown in FIG. 3. After step S405 is performed, subsequent steps are not performed.

When the UE needs to implement a service, the AS may be triggered to query the service chain function in the network from the PCRF. After obtaining the service chain function list that can be provided by the PCRF to the AS, the AS may perform another function step according to an actual need, and this is not limited herein.

Figure 5:
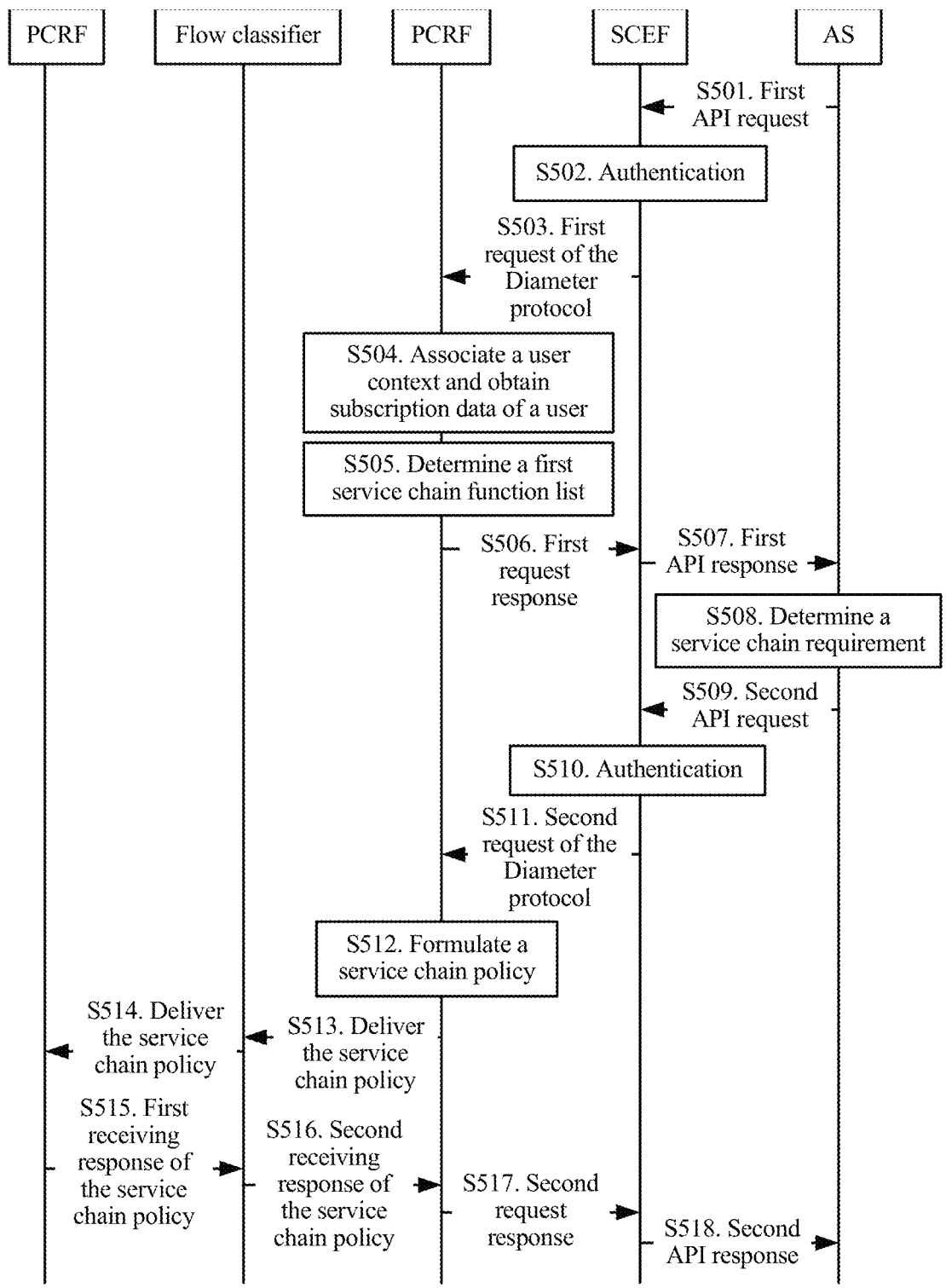
FIG. 5 is an interaction flowchart of another service chain policy formulation method according to an embodiment of the present invention.

FIG. 5 is an interaction flowchart of another method for service chain policy formulation according to an embodiment of the present invention. The method is more specific implementation steps of the methods shown in FIG. 3 and FIG. 4. An interaction process includes a specific message transfer form, and before an AS requests to formulate a service chain policy for a service flow, the AS further requests to query a service chain function deployed in a network. As shown in FIG. 5, the method includes the following steps.

S501. An AS sends a first API request to an SCEF, to request to query a service chain function in a network for a service flow.

The first API request may include information such as a UE ID, an application ID, an APN, or a media type. When a service enabling unit of a service provider is deployed in the network, the first API request may further include information that indicates the service function enabling unit of the service provider.

S502. The SCEF authenticates the first API request.

After authentication is successful:

S503. The SCEF converts the first API request into a first request of the Diameter protocol and sends the first request of the Diameter protocol to a PCRF.

Information included in the first request of the Diameter protocol is the same as that in the first API request.

When the first request of the Diameter protocol includes the UE ID, S504 is performed; otherwise, S505 is performed.

S504. The PCRF associates a user context according to the UE ID, and obtains subscription data of UE according to the UE ID.

S505. The PCRF determines a first service chain function list that can be provided by the network to the service flow.

If S504 is performed, the PCRF needs to determine, according to the obtained subscription data of the UE, a service chain function that can be provided by the network to the service flow.

S506. The PCRF sends a first request response to the SCEF, where the first request response includes the first service chain function list that can be provided by the network to the service flow.

S507. The SCEF sends a first API response to the AS, where the first API response includes the first service chain function list.

S508. The AS determines a service chain requirement of the service flow according to the first service chain function list and with reference to an attribute of the service flow.

S509. The AS sends a second API request to the SCEF, to request to formulate a service chain policy for the service flow.

The second API request includes the service chain requirement that is of the service flow and that is determined by the AS.

S510. The SCEF authenticates the second API request.

After authentication is successful:

S511. The SCEF converts the second API request into a second request of the Diameter protocol and sends the second request of the Diameter protocol to the PCRF.

Information included in the second request of the Diameter protocol is the same as that in the second API request.

S512. The PCRF formulates the service chain policy for the service flow according to the service chain requirement that is of the service flow and that is determined by the AS.

The service chain policy may be independently formulated or may be formulated concurrently with another policy in a PCC policy.

S513. The PCRF delivers the service chain policy to a flow classifier.

S514. The flow classifier delivers the service chain policy to a PCEF.

S515. The PCEF feeds back a first receiving response of the service chain policy to the flow classifier.

S516. The flow classifier feeds back a second receiving response of the service chain policy to the PCRF.

S517. The PCRF sends a second request response to the SCEF, to indicate successful service chain policy formulation.

S518. The SCEF sends a second API response to the AS, to indicate the successful service chain policy formulation.

According to the technical solution provided in this embodiment of the present invention, the AS requests to a network side to query the service chain function in the network, and the PCRF returns the service chain function list. The AS selects a required service chain function on demand according to the obtained service chain function list. In this way, the service chain policy can be more accurately and efficiently formulated, and the network side can better provide an optimized service to a service.

Figure 6A:
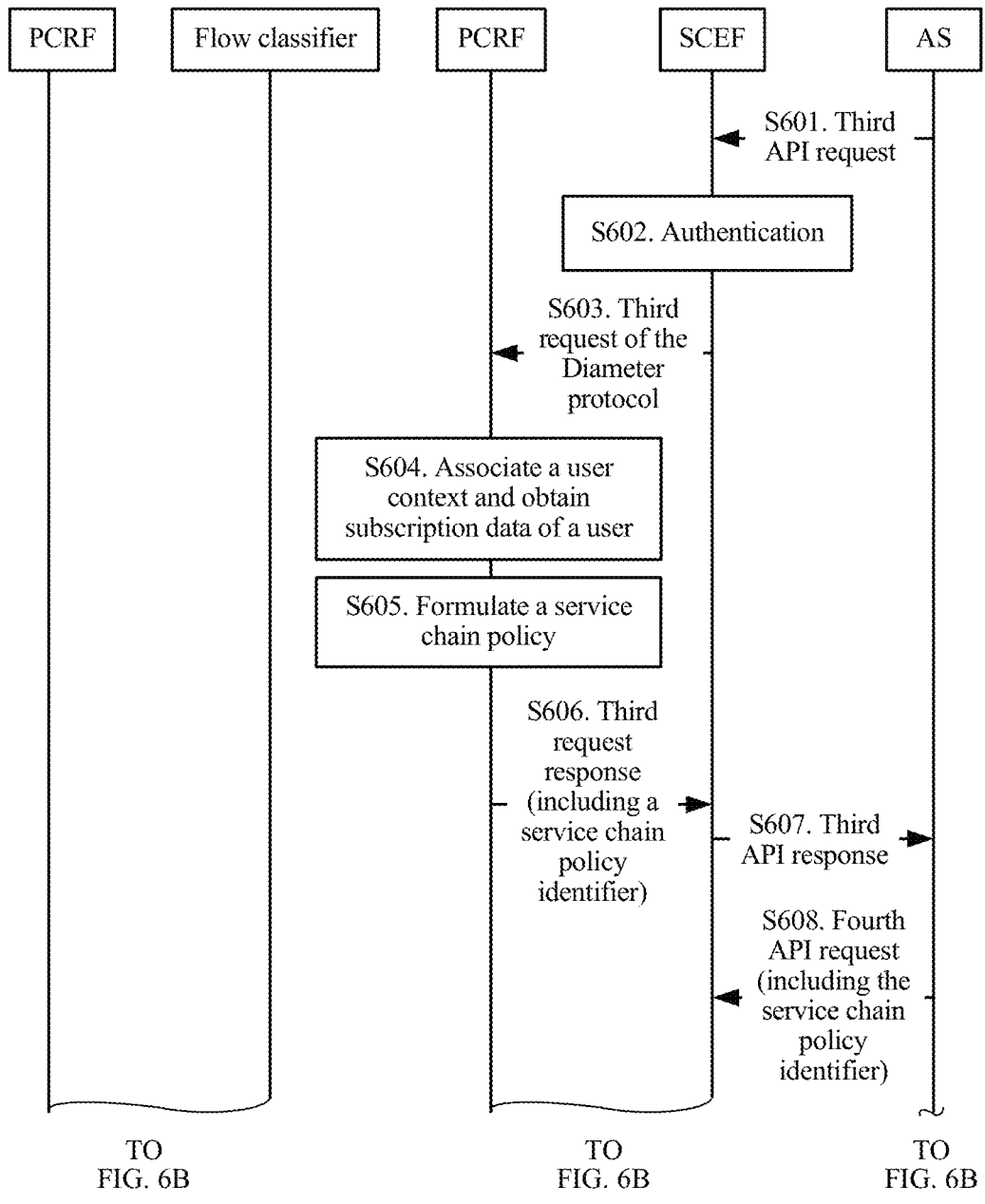
FIG. 6A and FIG. 6B are an interaction flowchart of a service establishment method according to an embodiment of the present invention.
Figure 6B:
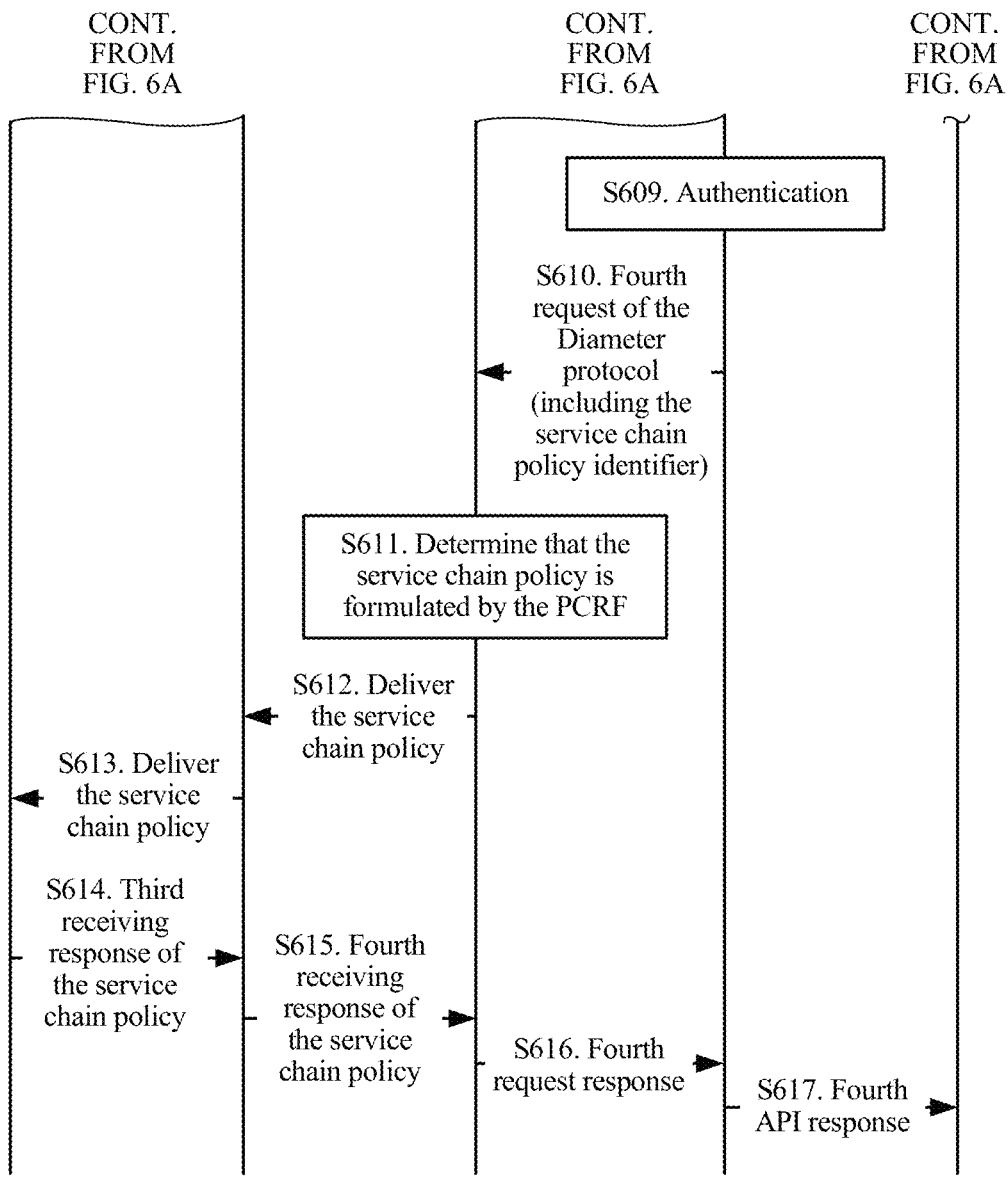

FIG. 6A and FIG. 6B are an interaction flowchart of a service establishment method according to an embodiment of the present invention. The method is more specific implementation steps of the methods shown in FIG. 3 and FIG. 4. An interaction process includes a specific message transfer form. As shown in FIG. 6A and FIG. 6B, the method includes the following steps.

S601. An AS sends a third API request to an SCEF, to request to formulate a service chain policy for a service flow.

The third API request includes a service chain requirement of the service flow, and may further include a UE ID, an application ID, an APN, a media type, or the like. When a service enabling unit of a service provider is deployed in a network, the third API request further includes information that indicates the service function enabling unit of the service provider.

S602. The SCEF authenticates the third API request.

After authentication is successful:

S603. The SCEF converts the third API request into a third request of the Diameter protocol and sends the third request of the Diameter protocol to a PCRF.

Information included in the third request of the Diameter protocol is the same as that in the third API request.

When the first request of the Diameter protocol includes the UE ID, S604 is performed; otherwise, S605 is performed.

S604. The PCRF associates a user context according to the UE ID, and obtains subscription data of a user according to the UE ID.

S605. The PCRF formulates the service chain policy for the service flow according to a service chain requirement included in the third request of the Diameter protocol.

If S604 is performed, the PCRF needs to simultaneously formulate the service chain policy for the service flow according to the obtained subscription data of UE.

S606. The PCRF sends a third request response to the SCEF, where the third request response includes a second service chain function list formed by a service chain function included in the service chain policy.

The third request response further includes a service chain policy identifier.

S607. The SCEF sends a third API response to the AS, where the third API response includes the second service chain function list.

S608. The AS sends a fourth API request to the SCEF, to request to establish a service corresponding to the service flow.

The fourth API request includes the service chain policy identifier.

S609. The SCEF authenticates the fourth API request.

After authentication is successful:

S610. The SCEF converts the fourth API request into a fourth request of the Diameter protocol and sends the fourth request of the Diameter protocol to the PCRF.

The fourth request of the Diameter protocol includes the service chain policy identifier.

S611. The PCRF determines that a service chain policy corresponding to the service chain policy identifier is the service chain policy previously formulated by the PCRF for the service flow.

S612. The PCRF delivers the service chain policy corresponding to the service chain policy identifier to a flow classifier.

S613. The flow classifier delivers the service chain policy to a PCEF.

S614. The PCEF feeds back a third receiving response of the service chain policy to the flow classifier.

S615. The flow classifier feeds back a fourth receiving response of the service chain policy to the PCRF.

S616. The PCRF sends a fourth request response to the SCEF, to indicate successful establishment of the service corresponding to the service flow.

S617. The SCEF sends a fourth API response to the AS, to indicate the successful establishment of the service of the service flow.

S618. The AS initiates uplink data transmission.

According to the technical solution provided in this embodiment of the present invention, the AS requests the PCRF to formulate the service chain policy, the request includes the service chain requirement, and the PCRF directly formulates the service chain policy according to the service chain requirement. In a service establishment process, the PCRF establishes the service according to the service chain policy previously formulated for the AS. According to the technical solution of the present invention, the service chain policy can be more accurately and efficiently formulated, and a network side can better provide an optimized service to the service.

Figure 7:
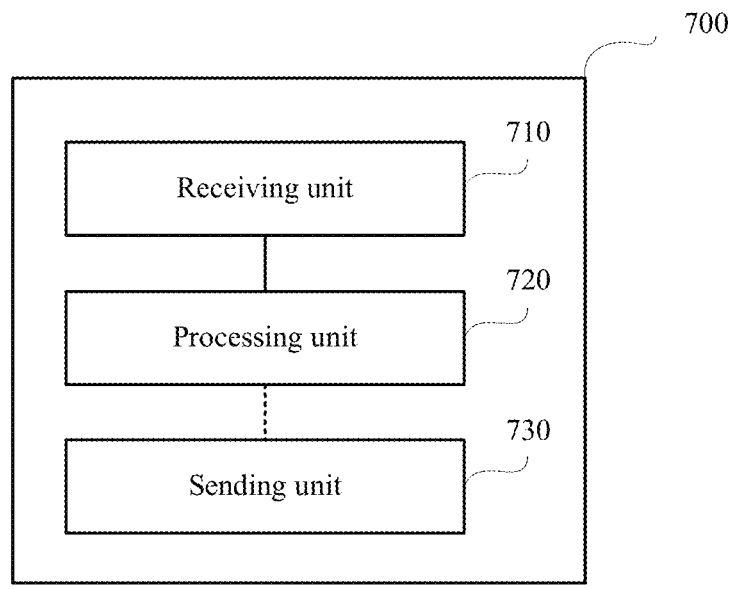
FIG. 7 is a schematic structural diagram of a PCRF according to an embodiment of the present invention.
Figure 8:
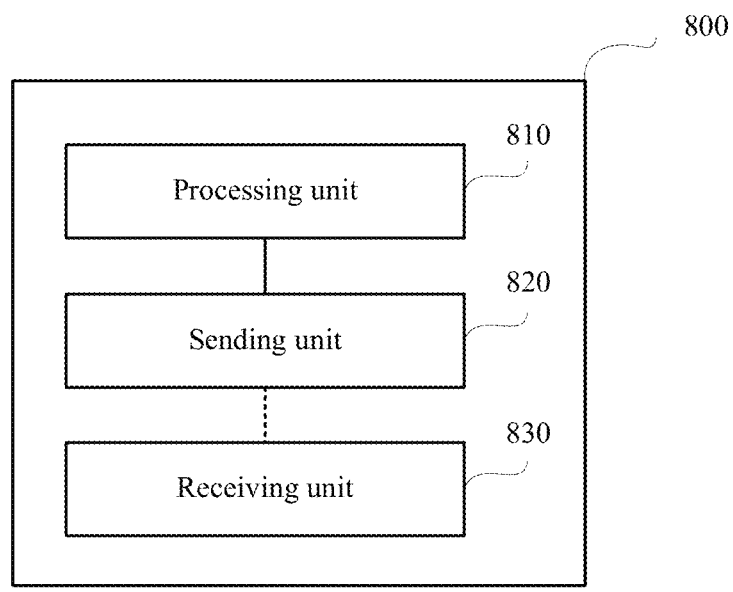
FIG. 8 is a schematic structural diagram of an AS according to an embodiment of the present invention.

To implement the technical solutions provided in the method embodiments shown in FIG. 3 to FIG. 6A and FIG. 6B, an embodiment of the present invention further provides a PCRF 700 and an AS 800. As shown in FIG. 7, FIG. 7 is a schematic structural diagram of the PCRF 700. As shown in FIG. 8, FIG. 8 is a schematic structural diagram of the AS 800.

The PCRF 700 includes:

a receiving unit 710, configured to receive, by using an SCEF, a first message sent by an AS, where the first message is used to request to formulate a service chain policy for a service flow of user equipment UE, and the first message includes a service chain requirement of the service flow; and a processing unit 720, configured to formulate the service chain policy for the service flow according to the service chain requirement that is of the service flow and that is included in the first message, where the service chain policy includes a service chain function provided to the service flow.

The AS 800 includes:

a processing unit 810, configured to determine that a service chain policy needs to be formulated for a service flow of user equipment UE; and a sending unit 820, configured to send a first message to a PCRF by using an SCEF, where the first message is used to request to formulate the service chain policy for the service flow, and the first message includes a service chain requirement of the service flow, so as to instruct the PCRF to formulate the service chain policy for the service flow according to the first message.

When UE that successfully attaches to a network has a service that needs to be implemented, the UE may trigger, by sending an instruction, the sending unit 820 of the AS 800 to send a first message, to request to formulate a service chain policy for a service flow. The service flow is corresponding to the service of the UE, and the service flow is a packet flow that needs to be transmitted from a source to a destination when the service is implemented. Certainly, the AS can learn, by means of analysis, that the UE has a service flow that needs to be executed, determine that a service chain policy needs to be formulated for the service flow, and actively send a first message.

The first message sent by the AS 800 may be carried in an API request, and the service chain requirement that is of the service flow and that is included in the first message may be at least one of value-added services such as a firewall, video compression, or acceleration. Correspondingly, the processing unit 720 of the PCRF 700 formulates the service chain policy for the service flow according to the service chain requirement. The service chain function provided to the service flow is a value-added service provided to the service flow, that is, a service function enabling unit through which the service flow flows.

Further, in addition to the service chain requirement of the service flow, according to a specific scenario requirement, the first message may further include at least one of a UE ID, an application ID of the service flow, an APN, or a media type. For example, if the first message includes the UE ID, the processing unit 720 of the PCRF 700 can associate a context of the UE according to the UE ID, and query subscription data of the UE from an SPR. The PCRF 700 learns, according to the subscription data, a service chain function that can be provided to the UE. With reference to the service chain requirement that is in the first message and that is imposed by the UE, the PCRF 700 formulates the service chain policy for the service flow. The service chain policy may include a service chain function corresponding to an intersection set of a service chain function in the service chain requirement and the service chain function that can be provided to the UE. For another example, if the first message includes the application ID, the application ID is corresponding to an attribute of the current service flow, and the receiving unit 710 of the PCRF 700 can actively select, for the service flow by means of screening, a service chain function that is suitable for the service flow. On this basis and with reference to the service chain requirement that is in the first message and that is imposed by the UE, the processing unit 720 of the PCRF 700 formulates the service chain policy for the service flow. The service chain policy may include a service chain function corresponding to an intersection set of a service chain function in the service chain requirement and the service chain function that can be provided to the service flow. If the first message includes the APN or the media type, a function and a purpose are similar to those of the UE ID or the application ID. A more accurate service chain policy is formulated for the service flow by narrowing a service chain function selection range.

When the first message includes at least two of the UE ID, the application identifier of the service flow, the APN, or the media type, it may be understood that, when the processing unit 720 of the PCRF 700 formulates the service chain policy for the service flow, the PCRF may formulate the service chain policy with reference to the service chain requirement and based on at least two service chain functions that can be provided to the UE or the service flow of the UE and that are learned according to information included in the first message. The service chain policy may include an intersection set function of the foregoing at least three parts of corresponding service chain functions.

Optionally, if a service provider deploys, in the network, a service function enabling unit of the service provider, the service chain requirement may include a service chain function corresponding to the service function enabling unit of the service provider. In this way, when formulating the service chain policy, the processing unit of the PCRF 700 can consider including the service chain function corresponding to the service function enabling unit of the service provider.

Optionally, the PCRF 700 further includes a sending unit 730, configured to: after the processing unit 720 formulates the service chain policy for the service flow, send a fourth message to the AS by using the SCEF, where the fourth message includes a service chain function list provided in the service chain policy that is formulated by the PCRF for the service flow.

The AS 800 further includes a receiving unit 830, configured to receive, by using the SCEF, the fourth message sent by the PCRF.

The sending unit 730 of the PCRF 700 notifies the AS 800 of a formulation result of the service chain policy. Particularly, a beneficial effect is obvious when a service chain policy actually formulated by the PCRF 700 is not completely consistent with the service chain requirement, because the AS 800 can learn that a requirement of the AS 800 is not completely met. In this case, the AS 800 may determine, according to the fourth message, to agree with the service chain policy, or may take a measure to coordinate to attempt to modify the service chain policy.

The service chain policy formulated by the PCRF may be corresponding to a service chain function list. The service chain function list includes a service chain function used by the service chain policy, that is, the service chain function list that is indicated in the fourth message and that is provided in the service chain policy formulated by the PCRF for the service flow.

Optionally, the fourth message further includes charging information related to a service function enabling unit corresponding to the service chain function list that is provided in the service chain policy formulated for the service flow.

Optionally, the fourth message includes a service chain policy identifier, so as to authenticate the service chain policy subsequently in a service establishment process.

According to the technical solution provided in this embodiment of the present invention, when a user needs to implement a service, the PCRF formulates, according to a message that is sent by the AS and that includes a requirement of a service flow corresponding to the service, a service chain policy that is suitable for the service flow. Compared with the prior art in which a service chain policy is formulated when a user attaches to a network and before a specific to-be-implemented service is determined, the service chain policy formulation manner is more flexible, so that a more accurate and efficient service chain rule can be formulated. In addition, in the prior art, because an operator subscribes to a large quantity of third-party service providers, costs for obtaining subscription data updated in real time are high. Consequently, although a third party can deploy a service function enabling unit of the third party between an operator gateway and an external network, the PCRF cannot learn specific function information of the service function enabling unit deployed by the third-party service provider, and cannot add the specific function information to the service chain policy and provide the specific function information to the AS. By means of the technical solution of the present invention, the AS only needs to specify, in the service chain requirement, an expected service chain function that is provided by a specific third-party service provider, and even though the PCRF does not know what the service chain function is, the PCRF can add the service chain function to the service chain policy and provide the service chain function to the AS. Therefore, the technical solution of the present invention provides a low cost implementation for a service flow of a UE service to use a service chain function provided by a third-party service provider.

Optionally, the sending unit 820 of the AS 800 is further configured to: before sending the first message to the PCRF by using the SCEF, send a second message to the PCRF by using the SCEF, where the second message is used to request to query a service chain function in a network for the service flow.

The receiving unit 710 of the PCRF 700 is further configured to: before receiving, by using the SCEF, the first message sent by the AS, receive, by using the SCEF, the second message sent by the AS.

The processing unit 720 of the PCRF 700 is further configured to determine, according to the second message, a service chain function list that can be provided by the PCRF to the AS.

The sending unit 730 of the PCRF 700 is further configured to send a third message to the AS by using the SCEF, where the third message includes the service chain function list that can be provided by the PCRF 700 to the AS 800.

The receiving unit 830 of the AS 800 is further configured to receive, by using the SCEF, the third message sent by the PCRF 700 according to the second message.

The sending unit 820 of the AS 800 is further configured to determine the service chain requirement of the service flow according to the service chain function list that is included in the third message and that can be provided by the PCRF 700 to the AS.

In addition to obtaining, from the UE, an attribute of the service flow corresponding to the service that needs to be implemented, if the AS 800 can learn in advance the service chain function list that can be provided by the PCRF 700 to the AS 800, obviously, the AS 800 can accordingly impose a more proper service chain requirement, to prevent a service chain function that cannot be provided by the PCRF 700 from being included in the service chain requirement.

Similar to the first message, the second message sent by the AS may be carried in the API request. The processing unit 720 of the PCRF 700 forms, according to the second message, all service chain functions deployed in the network into the service chain function list, and returns the service chain function list to the AS 800 by using the third message.

Optionally, the second message may include at least one of the UE ID, the application ID of the service flow, the APN, or the media type.

Optionally, if a service provider deploys, in the network, a service function enabling unit of the service provider, the second message may include information that indicates a service chain function corresponding to the service function enabling unit of the service provider. In this way, when determining the service chain function list that can be provided to the AS, the processing unit 720 of the PCRF 700 may include the service chain function corresponding to the service function enabling unit of the service provider.

When the AS 800 obtains, by using the third message, the service chain function that can be provided by the network to the AS, the processing unit 810 of the AS 800 selects, according to the attribute of the service flow of the UE and from the service chain function that can be provided by the network to the AS 800, a service chain function that actually needs to be provided to the service flow, and uses the service chain function as the service chain requirement.

According to the technical solution provided in this embodiment of the present invention, the AS selects a required service chain function on demand according to the obtained service chain function list that can be provided by the PCRF, so that the service chain requirement can be more proper, and a network side can better provide an optimized service to the service.

Optionally, that the AS 800 requests to query the service chain function in the network from the PCRF 700 may be independent of the AS 800 requesting the PCRF 700 to formulate the service chain policy for the service flow. That is, when the UE needs to implement a service, the AS 800 may be triggered to query the service chain function in the network from the PCRF 700. After obtaining the service chain function list that can be provided by the PCRF 700 to the AS 800, the AS 800 may perform another function step according to an actual need, and this is not limited herein.

Figure 9:
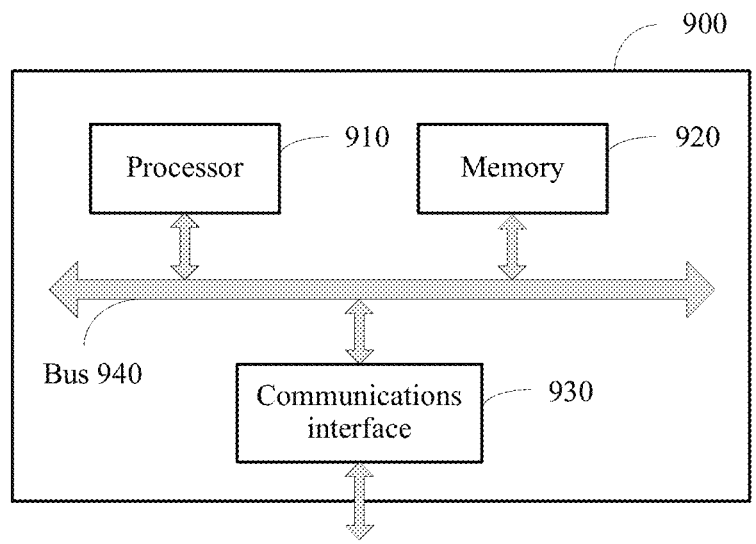
FIG. 9 is a schematic structural diagram of another PCRF according to an embodiment of the present invention.
Figure 10:
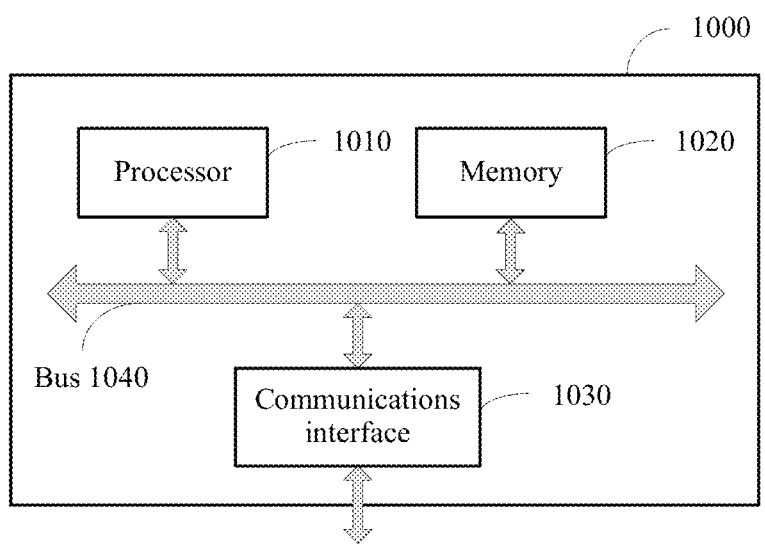
FIG. 10 is a schematic structural diagram of another AS according to an embodiment of the present invention.

An embodiment of the present invention further provides another PCRF 900 and another AS 1000. As shown in FIG. 9, FIG. 9 is a schematic structural diagram of the another PCRF 900. As shown in FIG. 10, FIG. 10 is a schematic structural diagram of the another AS 1000.

As shown in FIG. 9, the PCRF 1000 includes a processor 910, a memory 920, a communications interface 930, and a bus 940. The memory 920 stores an execution instruction. When the device runs, the processor 910 and the memory 920 communicate by using the bus 940. The processor 910 receives and sends information by using the communications interface 930, and performs, according to the computer instruction stored in the memory 920, steps of the methods disclosed in the method embodiments provided in FIG. 3 to FIG. 6A and FIG. 6B in the embodiments of the present invention.

As shown in FIG. 10, the AS 1000 includes a processor 1010, a memory 1020, a communications interface 1030, and a bus 1040. The memory 1020 stores an execution instruction. When the device runs, the processor 1010 and the memory 1020 communicate by using the bus 1040. The processor 1010 receives and sends information by using the communications interface 1030, and performs, according to the computer instruction stored in the memory 1020, steps of the methods disclosed in the method embodiments provided in FIG. 3 to FIG. 6A and FIG. 6B in the embodiments of the present invention.

According to the technical solution provided in this embodiment of the present invention, when a user needs to implement a service, the PCRF formulates, according to a message that is sent by the AS and that includes a requirement of a service flow corresponding to the service, a service chain policy that is suitable for the service flow. Compared with the prior art in which a service chain policy is formulated when a user attaches to a network and before a specific to-be-implemented service is determined, the service chain policy formulation manner is more flexible, so that a more accurate and efficient service chain rule can be formulated.

The processor shown in FIG. 9 and FIG. 10 may be a general purpose processor, a digital signal processor (DSP), an application-specific integrated circuit (ASIC), a field programmable gate array (FPGA) or another programmable logic device, a discrete gate or a transistor logic device, or a discrete hardware component. The general purpose processor may be a microprocessor or the processor may be any suitable processor, or the like. Steps of the methods disclosed with reference to the embodiments of the present invention may be directly executed and accomplished by means of a hardware decoding processor, or may be executed and accomplished by using a combination of hardware and software modules in the decoding processor. Computer instructions may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes steps in methods in the embodiments in combination with hardware of the processor.

A person of ordinary skill in the art may understand and implement all processes in the foregoing embodiments. The processes may be implemented by using a computer program instruction and coordinating related hardware.

In the solutions provided in the embodiments of the present invention, the "first", "second", "third", "fourth", and the like are merely for distinguishing between different objects, such as different messages or different service chain function lists, and are not intended to be limiting.

Limitation of application scenarios or the like in the foregoing embodiments is merely used to describe the specific technical solutions in the present invention and is not intended to limit the specific technical solutions in the present invention. That is, modifications may be made to the technical solutions recorded in the foregoing embodiments, or equivalent replacements may be made to technical features thereof. Without being affected by these modifications and replacements, the technical solutions still fall within the protection scope of the present invention.

What is claimed is:

1. A method, wherein the method comprises:
receiving, by a policy and charging rules function (PCRF) by using a service capability exposure function (SCEF), a second message sent by an application server (AS), wherein the second message is used to request a query of service chain function in a network for a service flow of a user equipment (UE);
determining, by the PCRF according to the second message, a first service chain function list available to be provided by the PCRF to the AS;
sending, by the PCRF, a third message to the AS by using the SCEF, wherein the third message comprises the first service chain function list;
receiving, by the PCRF by using the SCEF, a first message sent by the AS, wherein the first message is configured to request to formulate a service chain policy for the service flow when the UE uses the service flow, the first message comprising a service chain requirement of the service flow and the service chain policy defines a service chain that the service flow is to pass through, wherein the service chain requirement is determined according to the first service chain function list; and
formulating, by the PCRF, the service chain policy for the service flow according to the service chain requirement of the service flow included in the first message, wherein the service chain policy comprises a service chain function provided to the service flow and the service chain function specifies a value-added service provided to the service flow.

2. The method according to claim 1, wherein the first message comprises a user identity of the UE, an application identifier of the service flow, an access point name, or a media type of the service flow; and, wherein the method further comprises:
  determining, by the PCRF, a service chain function available to be provided by a network to the UE; and, wherein
  formulating, by the PCRF, the service chain policy for the service flow comprises: formulating the service chain policy according to the service chain requirement and the service chain function available to be provided by the network to the UE; and
  the service chain function included in the service chain policy corresponds to an intersection set of a service chain function in the service chain requirement and the service chain function available to be provided by the network to the UE.

3. The method according to claim 1, wherein the first message comprises an application identifier of the service flow; and, wherein
  the method further comprises: determining, by the PCRF, a service chain function available to be provided by a network to the service flow; and, wherein
  formulating, by the PCRF, the service chain policy for the service flow comprises: formulating the service chain policy according to the service chain requirement and the service chain function available to be provided by the network to the service flow; and
  the service chain function included in the service chain policy corresponds to an intersection set of a service chain function in the service chain requirement and the service chain function available to be provided by the network to the service flow.

4. The method according to claim 1, wherein the first message comprises an access point name; and, wherein
  the method further comprises: determining, by the PCRF, a service chain function available to be provided by a network to the service flow that flows through an access point; and, wherein
  formulating, by the PCRF, the service chain policy for the service flow comprises: formulating the service chain policy according to the service chain requirement and the service chain function available to be provided by the network to the service flow that flows through the access point; and
  the service chain function included in the service chain policy comprises corresponds to an intersection set of a service chain function in the service chain requirement and the service chain function available to be provided by the network to the service flow that flows through the access point.

5. The method according to claim 1, wherein the first message comprises a media type of the service flow; and, wherein
  the method further comprises: determining, by the PCRF according to the media type, a service chain function available to be provided by a network to the service flow; and, wherein
  formulating, by the PCRF, the service chain policy for the service flow comprises: formulating the service chain policy according to the service chain requirement and the service chain function available to be provided by the network to the service flow; and
  the service chain function included in the service chain policy corresponds to an intersection set of a service chain function in the service chain requirement and the service chain function available to be provided by the network to the service flow.

6. The method according to claim 1, wherein
  the service chain policy corresponds to a second service chain function list, and the second service chain function list comprises a service chain function used by the service chain policy; and
  after the formulating, by the PCRF, the service chain policy for the service flow, the method further comprises:
  sending, by the PCRF, a fourth message to the AS by using the SCEF, wherein the fourth message comprises the second service chain function list.

7. The method according to claim 1, wherein when a service provider deploys a service function enabling unit in a service chain of a network, and the service chain requirement comprises a service chain function corresponding to the service function enabling unit deployed by the service provider, the service chain policy comprises the service chain function corresponding to the service function enabling unit deployed by the service provider.

8. A service chain policy formulation method, wherein the method comprises:
  sending, by an application server (AS), a second message to a policy and charging rules function (PCRF) by using a service capability exposure function (SCEF), wherein the second message is used to request to query a service chain function in a network for a service flow of a user equipment (UE);
  receiving, by the AS by using the SCEF, a third message sent by the PCRF according to the second message, wherein the third message comprises a first service chain function list available to be provided by the PCRF to the AS;
  determining, by the AS, the service chain requirement of the service flow according to the first service chain function list comprised in the third message;
  determining, by the AS, that a service chain policy is to be formulated for the service flow when the UE uses the service flow; and
  sending, by the AS, a first message to the PCRF by using the SCEF, wherein the first message is configured to request to formulate the service chain policy for the service flow, and the first message comprises the service chain requirement of the service flow for instructing the PCRF to formulate the service chain policy for the service flow according to the first message, wherein the service chain policy comprises a service chain function and the service chain function specifies a value-added service provided to the service flow.

9. The service chain policy formulation method according to claim 8, wherein
  the determining, by the AS, that the service chain policy is to be formulated for the service flow comprises:
  determining, according to a fifth message received from the UE, that the service chain policy is to be formulated for the service flow, wherein the fifth message is used to trigger the AS to request the PCRF to formulate the service chain policy for the service flow.

10. The service chain policy formulation method according to claim 8, wherein
  the determining, by the AS, that the service chain policy is to be formulated for the service flow comprises:
  determining that the service chain policy is to be formulated for the service flow, by learning through analysis that the UE has a service flow that needs to be executed.

11. The service chain policy formulation method according to claim 10, wherein when a service provider deploys a service function enabling unit in a service chain of a network, and a second message comprises information that indicates the service function enabling unit deployed by the service provider, a first service chain function list comprises a service chain function corresponding to the service function enabling unit deployed by the service provider.

12. The service chain policy formulation method according to claim 8, wherein the first message or the second message comprises at least one of a user identity, an application identifier, an access point name, or a media type.

13. The service chain policy formulation method according to claim 8, wherein the method further comprises:
receiving, by the AS by using the SCEF, a fourth message sent by the PCRF, wherein the fourth message comprises a second service chain function list, and the second service chain function list comprises a service chain function used by the service chain policy.

14. The service chain policy formulation method according to claim 8, wherein when a service provider deploys a service function enabling unit in a service chain of a network, and the service chain requirement comprises a service chain function corresponding to the service function enabling unit deployed by the service provider, the service chain policy comprises the service chain function corresponding to the service function enabling unit deployed by the service provider.

15. An apparatus, comprising:
a processor; and
a non-transitory computer-readable storage medium coupled to the processor and storing programming instructions for execution by the processor, the programming instructions cause the processor to perform:
receiving a second message sent by an application server (AS), wherein the second message is used to request to query a service chain function in a network for a service flow of a user equipment (UE);
determining a first service chain function list available to be provided by a policy and charging rules function (PCRF) to the AS;
sending a third message to the AS by using a service capability exposure function (SCEF), wherein the third message comprises the first service chain function list; and
receiving by using the SCEF, a first message sent by the AS, wherein the first message is configured to request a formulation of a service chain policy for the service flow when the UE uses the service flow, the first message comprising a service chain requirement of the service flow and the service chain requirement being determined according to the first service chain function list; and
formulating the service chain policy for the service flow according to the service chain requirement of the service flow that is comprised in the first message, wherein the service chain policy comprises a service chain function provided to the service flow and the service chain function specifies a value-added service provided to the service flow.

16. An apparatus, comprising:
a processor; and
a non-transitory computer-readable storage medium coupled to the processor and storing programming instructions for execution by the processor, the programming instructions cause the processor to perform:
sending a second message to a policy and charging rules function (PCRF) by using a service capability exposure function (SCEF), wherein the second message is used to request to query a service chain function in a network for a service flow of a user equipment (UE);
receiving by using the SCEF, a third message sent by the PCRF according to the second message, wherein the third message comprises a first service chain function list available to be provided by the PCRF to the AS;
determining that a service chain policy is to be formulated for the service flow when the UE uses the service flow;
determining a service chain requirement of the service flow according to the first service chain function list comprised in the third message; and
sending a first message to the PCRF by using the SCEF, wherein the first message is configured to request to formulate the service chain policy for the service flow, the first message comprising the service chain requirement of the service flow for instructing the PCRF to formulate the service chain policy for the service flow according to the first message, wherein the service chain policy comprises a service chain function and the service chain function specifies a value-added service provided to the service flow.

\* \* \* \* \*